(12) United States Patent
Trimmer et al.

(10) Patent No.: US 8,490,352 B2
(45) Date of Patent: Jul. 23, 2013

(54) CONCRETE SANDWICH WALL INSERT

(75) Inventors: Douglas Trimmer, Oak Grove, MO (US); Dan Dugger, Lee's Summit, MO (US)

(73) Assignee: Precise Forms, Inc., Bates City, MO (US)

( * ) Notice: Subject to any disclaimer, the term of this patent is extended or adjusted under 35 U.S.C. 154(b) by 320 days.

(21) Appl. No.: 13/007,785

(22) Filed: Jan. 17, 2011

(65) Prior Publication Data
US 2012/0180411 A1 Jul. 19, 2012

(51) Int. Cl.
*E04B 1/16* (2006.01)
(52) U.S. Cl.
CPC ........................................ *E04B 1/16* (2013.01)
USPC ............. 52/220.1; 52/378; 52/405.3; 52/426; 52/431; 52/442; 52/745.09; 52/745.19
(58) Field of Classification Search
USPC .. 52/220.1, 378, 424–426, 431, 405.1–405.3, 52/442, 742.12, 745.09, 745.19
See application file for complete search history.

(56) References Cited

U.S. PATENT DOCUMENTS

| | | | | | |
|---|---|---|---|---|---|
| 2,645,929 | A | * | 7/1953 | Jones | 52/405.3 |
| 3,485,003 | A | * | 12/1969 | McDowell | 52/426 |
| 3,757,482 | A | * | 9/1973 | Haeussler | 52/405.3 |
| 4,329,821 | A | * | 5/1982 | Long et al. | 52/405.3 |
| 4,454,702 | A | * | 6/1984 | Bonilla-Lugo et al. | 52/405.3 |
| 4,489,530 | A | * | 12/1984 | Chang | 52/745.09 |
| 4,774,794 | A | * | 10/1988 | Grieb | 52/309.7 |
| 5,996,297 | A | * | 12/1999 | Keith et al. | 52/405.1 |
| 6,279,285 | B1 | * | 8/2001 | Kubica | 52/426 |
| 8,191,853 | B2 | * | 6/2012 | Long, Sr. | 249/40 |

* cited by examiner

*Primary Examiner* — Mark Wendell
*Assistant Examiner* — Matthew J Smith
(74) *Attorney, Agent, or Firm* — Hovey Williams LLP

(57) ABSTRACT

Improved concrete form insert assemblies (20) are provided for use in the construction of thermally insulated poured concrete sandwich wall structures (22). The insert assemblies (20) include a central sheet (32) of insulative material such as synthetic resin foam, which is preferably encapsulated by a sheath (78) to enhance the structural integrity of the sheet (32). A pair of reinforcing bar assemblies (46, 48) preferably made up of welded-together horizontal and vertical bars (50, 52) are respectively positioned adjacent the side surfaces (34, 36) of the sheet (32). The bar assemblies (46, 48) are secured to sheet (32) by means of connector elements (54) extending through the sheet (32) and presenting oppositely outwardly extending, apertured segments (56, 58). Connector bars (60) extend between adjacent horizontal bars (50) and include an elongated channel section (62) abutting the sheet (32) and a pair of endmost ears (64) which are secured to the bars (50) to thereby support the bar assemblies (46, 48) in standoff relationship to the sheet (32). The insert assemblies (20) are preferably prefabricated and installed at a construction site between upright concrete form panels (26, 28), as straight wall and corner units (80). The assemblies (20) may also be field-modified by installation of electrical wiring including boxes (94) and conduit (96). Concrete (30) is then poured, resulting in a complete sandwich wall structure (22). Use of the assemblies (20) significantly reduces construction time and costs, and thereby permits more economical usage of the form panels (26, 38).

23 Claims, 6 Drawing Sheets

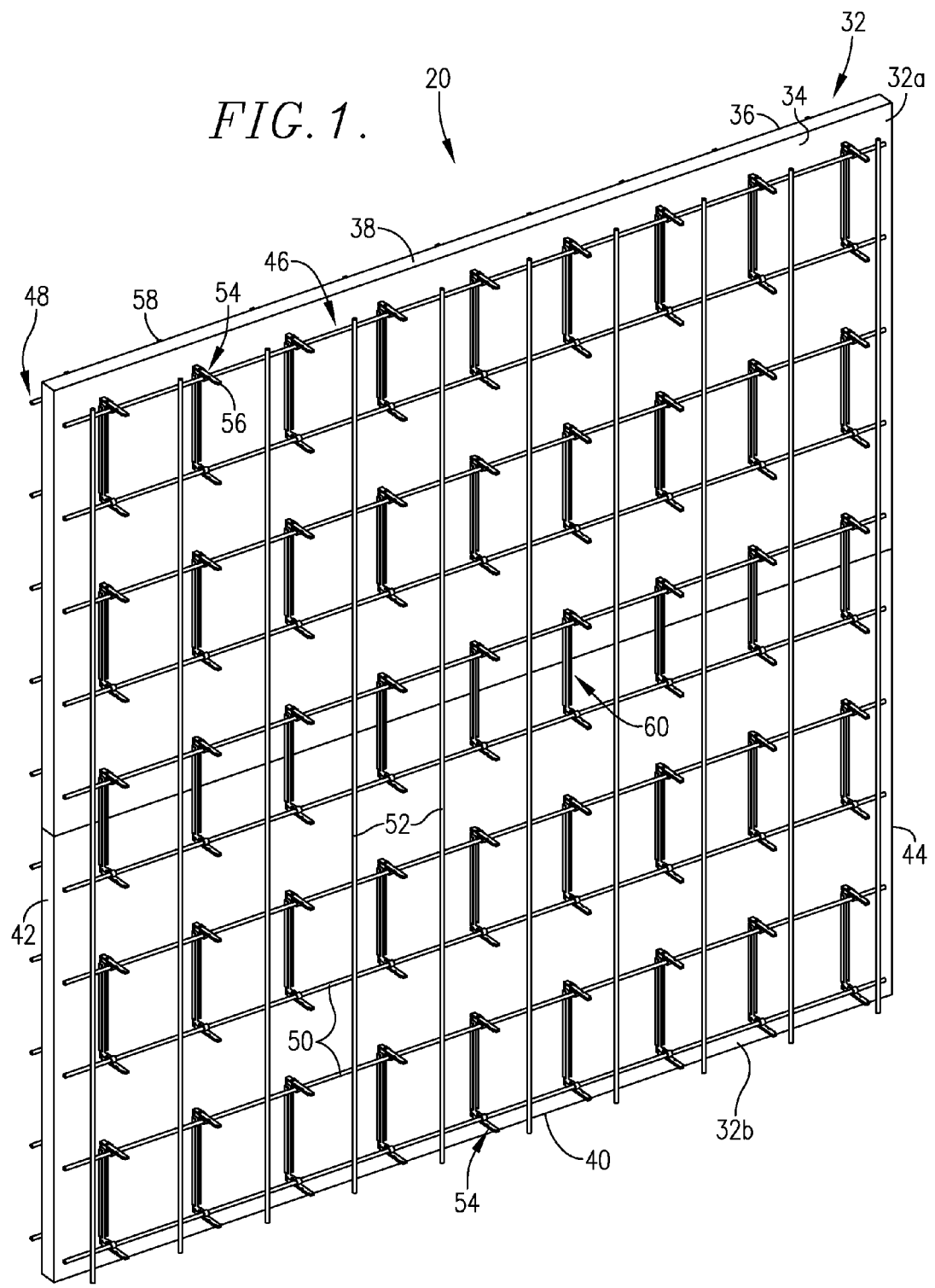

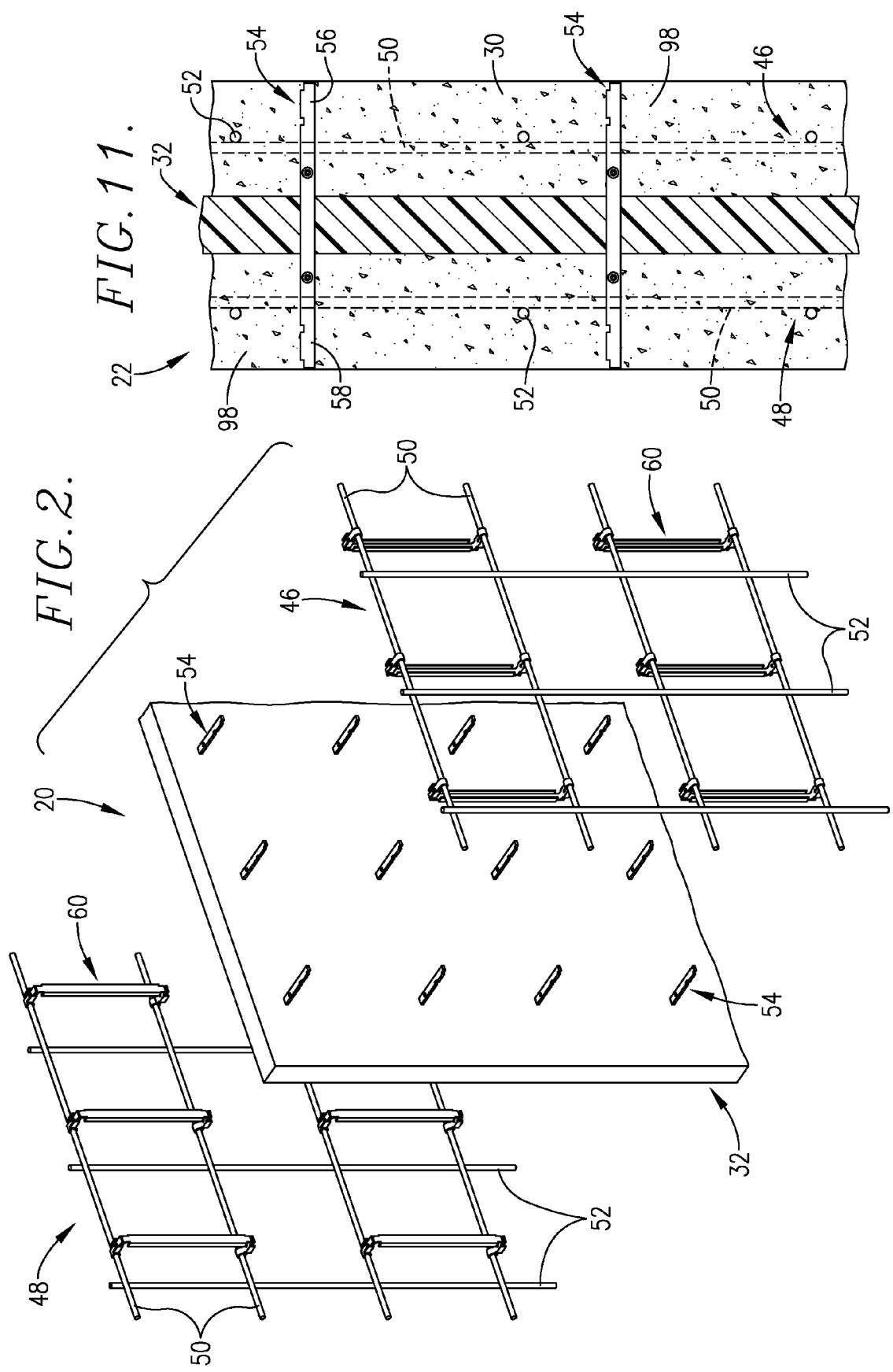

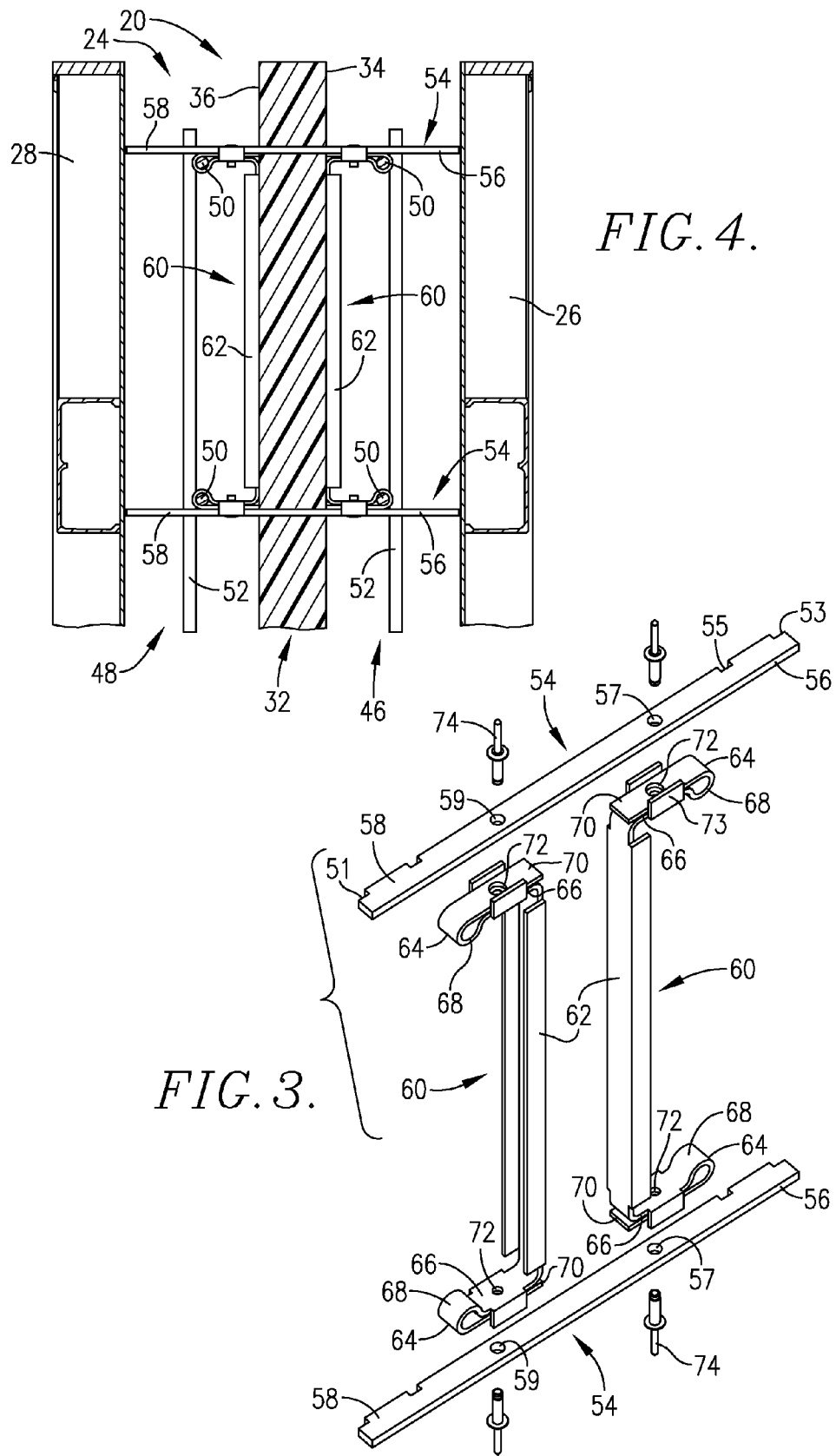

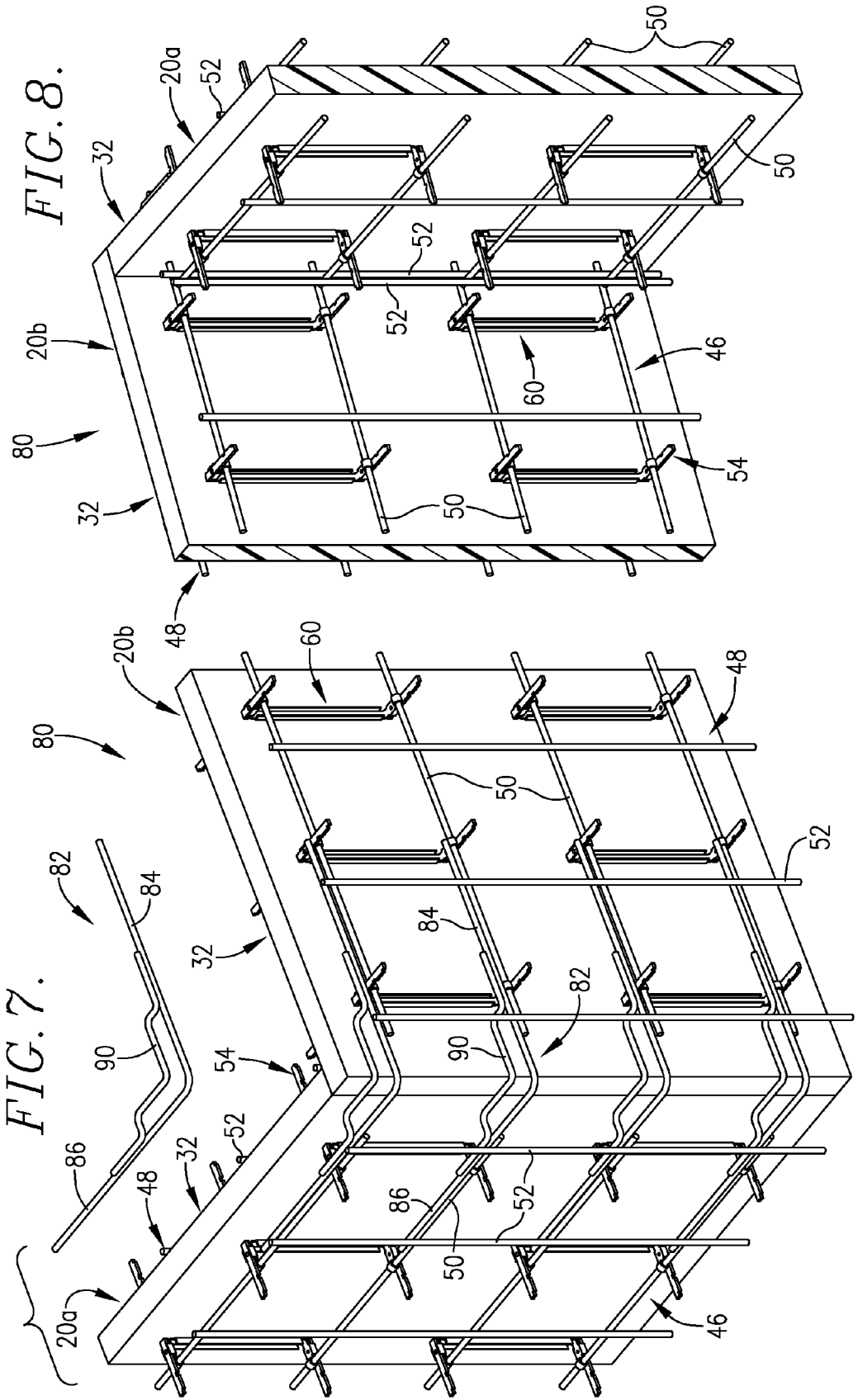

CONCRETE SANDWICH WALL INSERT

BACKGROUND OF THE INVENTION

1. Field of the Invention

The present invention is broadly concerned with improved apparatus and methods for the fabrication of poured concrete sandwich walls having a central, thermally insulating sheet or section. More particularly, the invention is concerned with insert assemblies which are preferably prefabricated and field-modified as needed, and are then positioned between conventional concrete form panels. The insert assemblies include a central insulative sheet with a pair of reinforcing bar assemblies adjacent each face of the sheet and operably coupled to the latter by means of cross-connectors.

2. Description of the Prior Art

Poured concrete wall structures may be equipped with one or more internal, upright sheets or bodies of thermal insulation, typically made up of a synthetic resin foam material. Such wall structures are known in the art as sandwich walls, referring to the fact that the insulating foam is sandwiched between outer concrete layers. The construction of concrete sandwich walls generally involves placing the insulative foam between opposed concrete form panels together with reinforcing bars on opposite sides of the foam, and pouring concrete into the form.

However, there are a number of problems associated with the construction of concrete sandwich walls. The insulating foam has very little structural rigidity, and can easily become warped or broken by the concrete as it is poured. Accordingly, it is the practice to carefully pour the concrete on both sides of the insulating foam in an even fashion, in an effort to avoid overloading and harming the foam material. Moreover, while the reinforcing bars are placed precisely relative to the foam material prior to the pour, the bars tend to float or shift during the pour, often leading to foam movement or damage. In some cases spoked "wheels" are positioned around the reinforcing bars during setup, in order to partially secure the bars in place. But if the bars shift during the pour, the spokes can penetrate the foam, degrading the entire sandwich wall.

The assembly of the insulating foam/reinforcing bars, with or without positioning wheels, is carried out at the construction site with the form panels. This is a time-consuming, labor-intensive undertaking normally extending over several days, which necessarily ties up the form panels and ancillary forming equipment resulting in lost opportunities to do other construction jobs.

U.S. Pat. Nos. 4,805,366, 4,829,733 and 5,671,574 describe the construction of concrete sandwich walls. The primary function of the forming apparatus of these patents is to center the insulating foam during the pour. Reinforcing bar assemblies are utilized, but the assembly bars are simply tied together and also tied to transverse form ties, without any direct connection to the foam. As such, the bar assemblies can shift during a pour.

There is accordingly a need in the art for improved apparatus and methods for the construction of concrete sandwich walls, which minimize or eliminate the problems inherent in prior art practices.

SUMMARY OF THE INVENTION

The present invention overcomes the problems outlined above, and provides greatly improved insert assemblies operable to be located between a pair of opposed concrete forming panels prior to a concrete pour to yield a concrete sandwich wall structure. Broadly speaking, such inserts include a sheet of thermal insulating material presenting a pair of opposed side surfaces, with a reinforcing bar assembly located adjacent each of the opposed sheet faces.

Connection structure operably secures the reinforcing bar assemblies to the sheet so as to inhibit significant relative movement between the sheet and reinforcing bar assemblies during a concrete pour.

Preferably, the sheet is formed of synthetic resin foam material and has a reinforcing fabric, such as fiberglass, in contact with at least the side surfaces of the sheet; more preferably, the reinforcing fabric completely envelops the sheet. The connection structure comprises a plurality of connector elements extending through the sheet, with structure operably interconnecting each of the bar assemblies with the opposed ends of the connector elements. In order to maintain the thermal integrity of the insert assembly, the connector elements are formed of thermally insulative synthetic resin material, such as fiberglass.

The reinforcing bar assemblies are preferably in the form of a regular grid made up of interconnected, generally horizontal and generally vertical reinforcing bars. Advantageously, the bars are welded together to enhance the strength of the bar assemblies.

The insert assemblies of the invention are normally prefabricated and are erected on-site with conventional concrete form panels. However, owing to the construction of the insert assemblies, they can readily be field-modified by attachment of electrical boxes and conduit. This assures that the boxes are precisely placed where desired. Once a completed sandwich wall structure form is erected with inserts between spaced form panels, concrete is poured into the form. Given the fact that the insert assemblies are substantially rigidified, concrete can be separately poured on opposed sides of the insulating sheets of the insert assemblies, without fear of warpage or breaking of the sheets.

The insert assemblies of the invention permit rapid construction of concrete sandwich walls with a minimum of labor and downtime. This in turn permits more economic utilization of the forming panels and ancillary forming equipment than has heretofore been possible.

BRIEF DESCRIPTION OF THE DRAWINGS

FIG. 1 is a perspective view of a preferred wall insert assembly for use in a poured concrete sandwich wall structure;

FIG. 2 is an enlarged, fragmentary, exploded view of the insert assembly of FIG. 1;

FIG. 3 is an enlarged, exploded perspective view of the preferred reinforcing grid attachment brackets forming a part of the insert assembly;

FIG. 4 is a fragmentary vertical sectional view illustrating the preferred insert assembly of the invention, located between a pair of spaced apart concrete form panels and prior to a concrete pour to form a sandwich wall structure;

FIG. 7 is an enlarged, fragmentary, perspective view depicting a pair of the insert assemblies of the invention in orthogonal relationship to define a corner, and further illustrating the preferred outside corner supports interconnecting the reinforcing grids of the orthogonal insert assemblies;

FIG. 8 is a view similar to that of FIG. 7, but depicting the construction of the inside corner of the orthogonal insert assemblies;

FIG. 11 is fragmentary, sectional view of a completed poured concrete sandwich wall structure including the preferred insert assembly of the invention.

DETAILED DESCRIPTION OF THE PREFERRED EMBODIMENT

Figure 6:
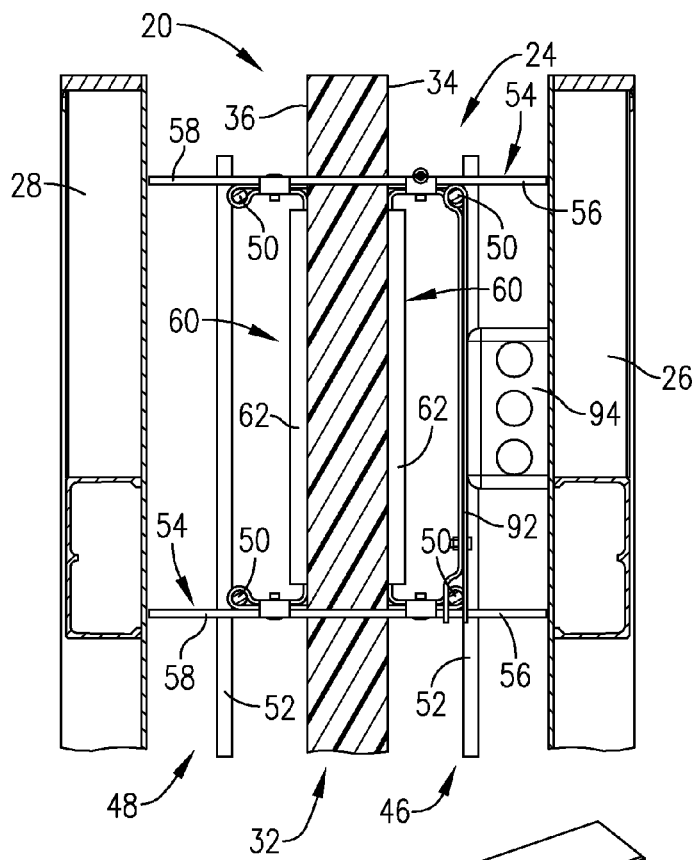
FIG. 6 is a fragmentary view similar to that of FIG. 4, but illustrating the optional electrical box assembly coupled with a reinforcing grid of the insert assembly.

The present invention is directed in part to thermally insulating insert assemblies 20 of a type used during construction of complete, poured concrete sandwich wall structures 22 (FIG. 11). That is to say, the inserts 20 of the invention are designed to be placed within an upright space 24 between a pair of opposed, upright concrete form panels 26 and 28. Thereupon, concrete 30 is poured into the space 24 in surrounding relationship to insert assembly 20, and allowed to cure, thereby providing the complete poured sandwich wall structure 22.

In more detail, the preferred assembly 20 includes an upright body or sheet 32 of thermally insulative material, such as a synthetic resin foam, presenting a pair of opposed side surfaces 34, 36, top and bottom surfaces 38, 40, and end surfaces 42, 44. As such, the sheet 32 is of square (e.g., 8' by 8') or rectangular configuration, as may be desired. In the embodiment illustrated in FIG. 1, the sheet 32 is made up of a pair of aligned and stacked sheet subsections 32a and 32b, although a unitary sheet may be used if desired. Advantageously, the sheet 32 has a thickness of from about 1-4 inches, more preferably from 1.5-3 inches, and most preferably about 2 inches.

The overall insert assembly 20 also includes a pair of reinforcing bar assemblies 46 and 48, respectively located adjacent the side surfaces 34 and 36 of sheet 32. In this embodiment, each of the reinforcing bar assemblies 46, 48, is made up of a plurality of generally horizontally extending, vertically spaced apart reinforcing bars 50, as well as a plurality of upright, laterally spaced apart vertical reinforcing bars 52. The bars 50, 52 are preferably welded together so that each of the assemblies 46, 48 is in the form of a regular grid.

The assemblies 46, 48 are operatively coupled with sheet 32 by means of a series of elongated, synthetic resin connector elements 54, preferably fabricated from fiberglass. The elements 54 extend through the sheet 32 and have outwardly projecting segments 56 with through openings 57 adjacent the horizontally extending reinforcing bars 50 of assembly 46, and similar outwardly extending segments 58 with through openings 59 adjacent the horizontally extending reinforcing bars 50 of the opposed assembly 48. The segments 56 and 58 comprise notches 55 as shown to achieve a better connection with poured concrete.

Elongated connector bars 60 (FIG. 3) extend between each pair of vertically spaced apart segments 56 and 58 adjacent the opposite side surfaces 34, 36 of sheet 32. Each connector bar 60 includes a central channel section 62 having a pair of endmost, outwardly extending connection ears 64. Each ear 64 has a projecting segment 66, an outboard circular loop section 68 sized to receive and envelop a corresponding reinforcing bar 50, and a reverse segment 70 in face-to-face relationship with segment 66. A connection aperture 72 extends through the segments 66 and 70, as shown, and is aligned with a corresponding segment opening 57 or 59. As further illustrated in FIG. 3, connector rivets 74 extend through the openings 57 and 59 of the elements 54 and the connection apertures 72 of the ears 64. Projecting segment 66 further includes a pair of sidewalls 73, preferably located proximate connector apertures 72. Sidewalls 73 receive connector elements 54 and prevent element 54 from shifting about the pivot point created by connector rivet 74 during a concrete pour. It will thus be appreciated that the base of each channel section 62 is in abutting relationship with a side surface of the sheet 32, with the connection ears 64 thereof secured to and supporting the corresponding reinforcing bars 50, and hence the bar assemblies 46, 48. In this fashion, significant relative movement is inhibited between the assemblies 46 and 48 and sheet 32 during a concrete pour.

Figure 5:
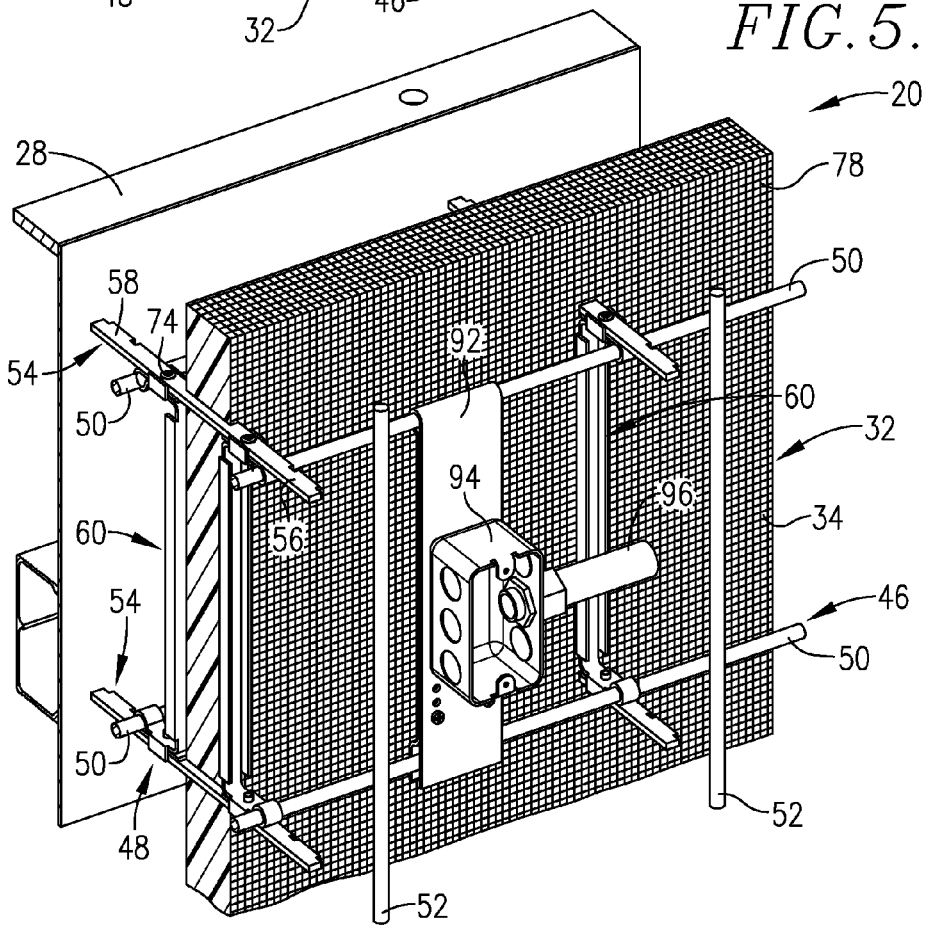
FIG. 5 is a fragmentary, perspective view illustrating the insert assembly with an optional electrical box assembly coupled to a reinforcing grid of the insert assembly.

In preferred forms, the sheet 32 is equipped with a reinforcing sheathing 78 (FIG. 5). At a minimum, the sheathing 78 should be adjacent and secured to the side surfaces 34 and 36. More preferably, however, the sheathing 78 covers all of the surfaces 34-44 to thereby completely envelop the sheet 32. The sheathing 78 is advantageously in the form of 1/8" fiberglass mesh material which imparts strength to the sheet 32 and inhibits deflection of the material of the sheet. Additionally, the presence of the sheathing 78 reduces the likelihood of foam breakage during a concrete pour. With this sheet construction, it is possible to pour entirely on one side of the sheet 32 at a time, which facilitates construction of a sandwich wall structure.

The most preferred sheathing 78 includes multiple strands of interwoven fiberglass fibers embedded within synthetic resin to enhance the strength of the sheet 32. The following Table sets forth the preferred characteristics of the sheathing 78.

| 4.3 oz Mesh | | |
|---|---|---|
| Weave | | Leno |
| Material (Tex): | Warp: | 198 |
|  | Weft: | 198 |
| Density (count/inch) | Warp: | 6 |
|  | Weft: | 5 |
| Unit Weight (g/m$^2$) | Raw | 112 +− 4 |
|  | Finished Product | 160 +− 5 |
| Content of resin |  | ≧28% |
| Tensile Strength | Warp: | ≧1200 |
|  | Weft: | ≧800 |
| Tensile Strength after days conditioning in 5% NaOH: | Warp: | ≧60% of original |
|  | Weft: | ≧60% of original |

As noted above, the connector elements 54 are preferably made of fiberglass without metal, which would degrade the insulative properties of the insert 20. Additionally, the connector elements 54 have a length slightly less (e.g., from about 1/16-1/2", more preferably about 1/8") less than the width of the final sandwich wall structure so that the elements will be completely hidden after a concrete pour. The outboard ends 51, 53 of connector elements 54 are notched so that should connector element 54 not be entirely hidden following the concrete pour, the exposed surface area thereof is reduced.

The use of the preferred connector bars 60 inhibits any twisting or movements of the reinforcing bar assemblies 46, 48 during concrete pour. The presence of the channel sections 62 in close abutting relationship to the side surfaces of sheet 32 renders the insert very strong. The spacing of the connector elements 54 and connector bars 60 may vary. The horizontal spacing between the bars 52 is preferably from about 6-16", and more preferably from about 9-12", center-to-center. Vertical spacing between the bars 50 is preferably from about 14-24", more preferably from about 18-22", center-to-center. In the illustrated embodiment, the bars 50, 52 are positioned on 10" centers, so as to avoid any interference with the form ties, which are typically located on 12" centers, beginning 6" above the wall structure footing. The bars 50 and 52 are formed using weldable rebar material, which is much stronger than conventional rebar. This provides earthquake-resistant qualities in the complete sandwich wall structures.

Figure 9:
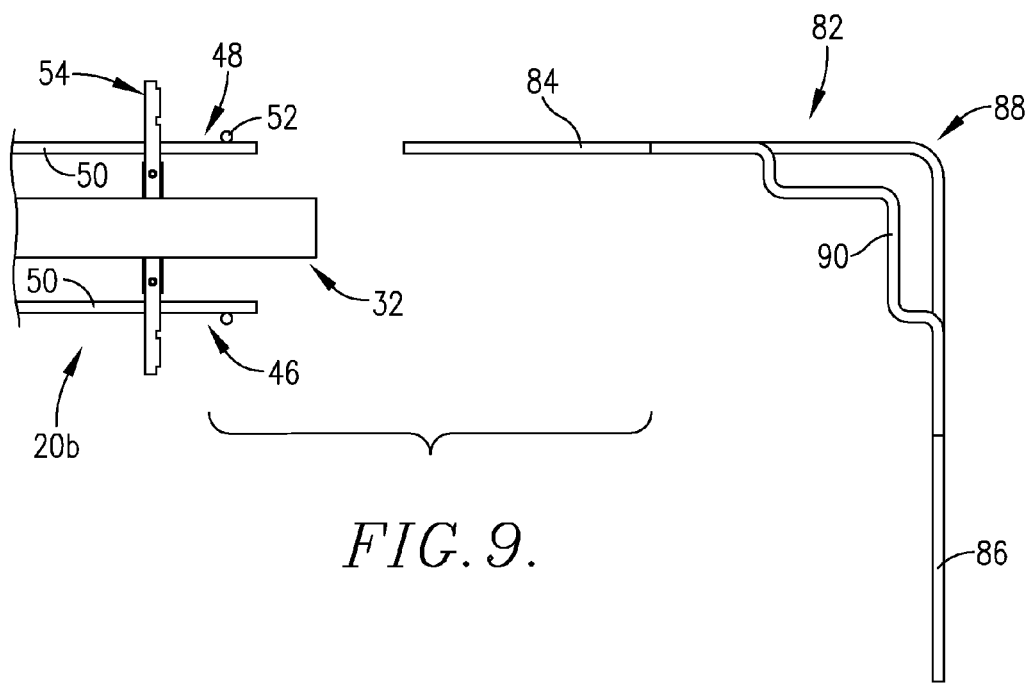
FIG. 9 is a plan view of the preferred outside corner support, and one of the orthogonally oriented insert assemblies of the corner.
Figure 10:
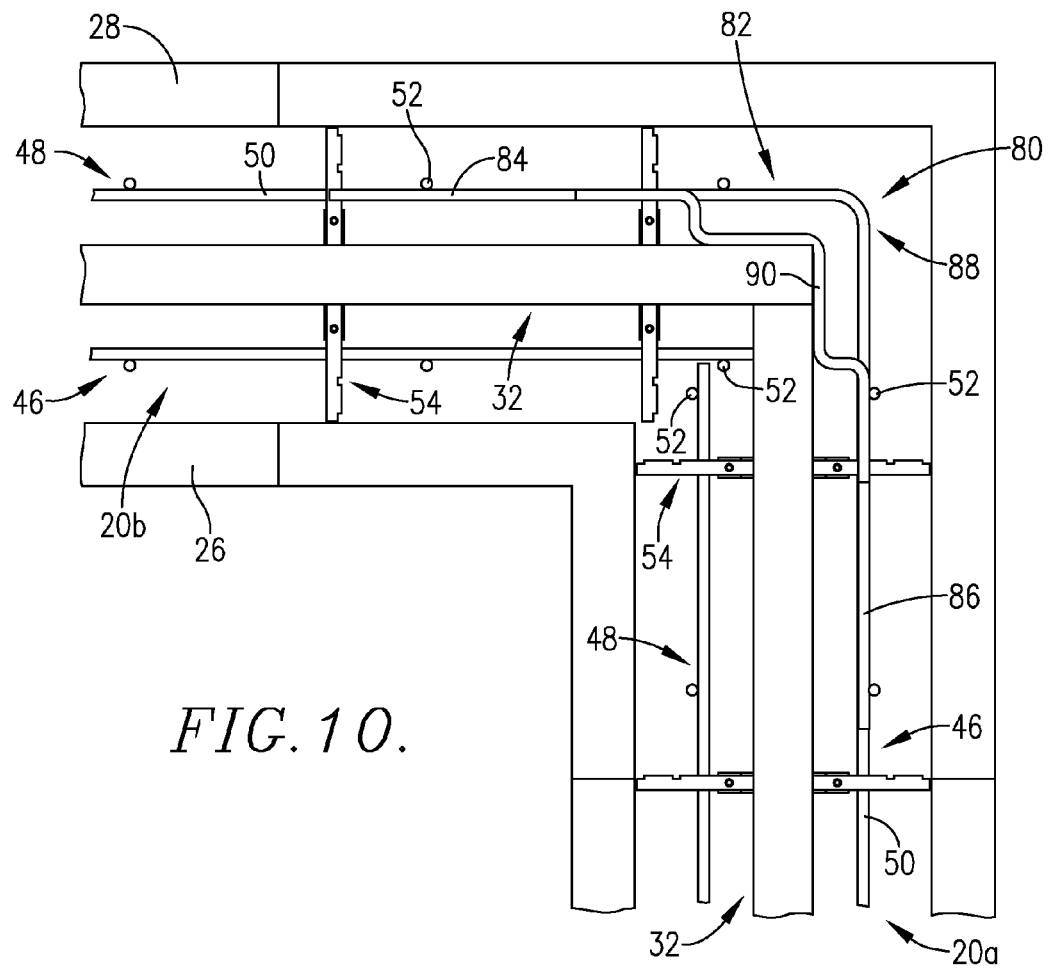
FIG. 10 is a plan view of the assembled corner, including the orthogonally oriented insert assemblies and the corner supports.

Turning now to FIGS. 7 and 8, a corner unit 80 is illustrated. The unit 80 is made up of first and second insert assemblies 20*a* and 20*b*, which are oriented in an orthogonal relationship to each other. The assemblies 20*a*, 20*b* are identical with the previously described assembly 20, and therefore like reference numerals are employed. In order to provide a reinforced corner at the junction between the assemblies 20*a* and 20*b*, specialized outside corner connectors 82 are employed. Each such connector 82 (FIG. 9) includes a pair of integral leg elements 84 and 86 cooperatively defining a corner region 88. A generally L-shaped abutment element 90 is secured to each of the legs 84, 86 and extends inwardly from the latter. In order to construct the corner unit 80, the insert assemblies 20*a* and 20*b* are set in place, and a series of connectors 82 are secured to the horizontal bars 50 by coupling the legs 84, 86 thereof to the adjacent terminal stretches of the orthogonally oriented bars 50. This coupling may be effected by the use of wire ties or any other convenient means. In this manner, the abutment elements 90 come into close conforming relationship with the outer surfaces of the sheets 32. This ensures that there is no separation between the insert assemblies 20*a*, 20*b* during a concrete pour. The inside of corner unit 80 (FIG. 8) is strengthened by tying or otherwise coupling the terminal upright bars 52 of the orthogonally oriented insert assemblies 20*a*, 20*b*.

In preferred practice, the insert assemblies 20 are prefabricated in a factory away from the construction site. They are thus shipped to a construction site as substantially complete insert assemblies ready for setup, which can be accomplished without site modification of the assemblies, as desired. However, a significant advantage of the present invention allows electrical wiring to be accomplished on-site, including placement of boxes and conduits applied where needed. As illustrated in FIGS. 5 and 6, a connector strap 92 may be secured between a pair of horizontally extending bars 50, with the strap 92 supporting a conventional electrical box 94. As required, conduit 96 can also be secured in place within the confines of the assemblies 20. Also, window and door openings can be provided by appropriate mounting of frame structures (not shown). Once all of the assemblies 20 for a given job are modified as necessary, they are placed in end-to-end relationship to form continuous walls and corner units 80 as required. Thereupon, conventional sectionalized concrete form panels 26, 28 are positioned on opposite sides of the insert assemblies, as illustrated in FIGS. 4 and 6, and are secured in place by means of transverse ties (not shown) or other conventional means. Note that the ends of the connector elements 54 are closely adjacent the inner surfaces of the panels 26 and 28, but still are inboard thereof so that the connector elements do not protrude through the outer surface of the sandwich wall.

The insert assemblies may be used in conjunction with any type of concrete form system, such as wooden or metal form panels. If the concrete form system requires the use of metal ties that extend through the wall, the ties are removed from the wall following the concrete pour, and any voids or holes left by the ties are filled with an appropriate filler material. Thus, the thermally insulative properties of the finished concrete wall are preserved irrespective of the concrete form system used to construct the wall.

Once the panels and insert assemblies are properly positioned, concrete 30 is poured into the space between the form panels, thereby embedding the insert assemblies 20 within and between the concrete outer sections 98. Upon curing and removal of the panels 26, 28, a complete sandwich wall construction 22 is formed (FIG. 11).

Prefabrication of the inserts 20 leads to better quality control and lower labor costs, as compared with the prior practice of complete on-site construction of foam and reinforcing bar assemblies. Nonetheless, the prefabricated inserts can be field-modified by the appropriate contractors at the construction site, before the form panels are delivered and erected. Using the inserts of the invention allows the form panels to be erected with a concrete pour on the same day, allowing greater utilization of the panels at different sites.

We claim:

1. An insert assembly operable to be located between a pair of opposed concrete forming panels prior to a concrete pour to form a concrete sandwich wall structure, said insert assembly comprising:
    a sheet of thermal insulating material presenting a pair of opposed side surfaces;
    a reinforcing bar assembly located adjacent each of said opposed side surfaces; and
    connection structure operably securing said reinforcing bar assemblies to said sheet so as to inhibit significant relative movement between said sheet and said reinforcing bar assemblies during said concrete pour,
    said connection structure comprising a plurality of connector elements extending through said sheet and a plurality of elongated bar elements, each of said bar elements comprising a central segment disposed in abutting relationship to at least one of said opposed side surfaces and a pair of connection ears extending transversely from said central segment,
    said bar elements interconnecting corresponding pairs of said connector elements on opposite sides of said sheet through attachment of said connector elements to a respective connection ear, said reinforcing bar assemblies also being attached to said bar elements via said connection ears.

2. The insert assembly of claim 1, said sheet being formed of synthetic resin foam material.

3. The insert assembly of claim 1, said sheet having reinforcing fabric in contact with each of said side surfaces.

4. The insert assembly of claim 3, said reinforcing fabric comprising fiberglass.

5. The insert assembly of claim 3, said reinforcing fabric completely enveloping said sheet.

6. The insert assembly of claim 1, each of said connector elements formed of thermally insulative synthetic resin material.

7. The insert assembly of claim 1, each of said reinforcing bar assemblies comprising a plurality of vertically spaced apart, generally horizontally extending reinforcing bars, and a plurality of upright, laterally spaced apart reinforcing bars, said horizontally extending reinforcing bars being secured to said upright reinforcing bars to present a reinforcing bar grid.

8. The insert assembly of claim 7, said generally horizontally extending reinforcing bars being welded to said upright reinforcing bars.

9. The insert assembly of claim 1, including an electrical box supported by at least one of said reinforcing bar assemblies.

10. An insert assembly operable to be located between a pair of opposed concrete forming panels prior to a concrete pour to form a concrete sandwich wall structure, said insert assembly comprising:
- a sheet of thermal insulating material presenting a pair of opposed side surfaces;
- a reinforcing bar assembly located adjacent each of said opposed faces;
- connection structure operably securing said reinforcing bar assemblies to said sheet so as to inhibit significant relative movement between said sheet and said reinforcing bar assemblies during said concrete pour;
- an electrical box supported by at least one of said reinforcing bar assemblies; and
- a strap extending between and operably secured to a pair of reinforcing bars forming a part of said reinforcing bar assembly, said electrical box being secured to said strap.

11. A concrete form assembly for producing a concrete sandwich wall structure and comprising:
- a pair of upright, laterally spaced apart concrete form panels defining a space therebetween; and
- an insert assembly located within said space and between said form panels, said insert assembly including—
    - a sheet of thermal insulating material presenting a pair of opposed side surfaces;
    - a reinforcing bar assembly located adjacent each of said opposed side surfaces; and
    - connection structure operably securing said reinforcing bar assemblies to said sheet so as to inhibit significant relative movement between said sheet and said reinforcing bar assemblies during said concrete pour,
    - said connection structure comprising a plurality of connector elements extending through said sheet and a plurality of elongated bar elements, each of said bar elements comprising a central segment disposed in abutting relationship to at least one of said opposed side surfaces and a pair of connection ears extending transversely from said central segment,
    - said bar elements interconnecting corresponding pairs of said connector elements on opposite sides of said sheet through attachment of said connector elements to a respective connection ear, said reinforcing bar assemblies also being attached to said bar elements via said connection ears.

12. The form assembly of claim 11, said sheet being formed of synthetic resin foam material.

13. The form assembly of claim 11, said sheet having reinforcing fabric in contact with each of said side surfaces.

14. The form assembly of claim 13, said reinforcing fabric comprising fiberglass.

15. The form assembly of claim 13, said reinforcing fabric completely enveloping said sheet.

16. The form assembly of claim 11, each of said connector elements formed of thermally insulative synthetic resin material.

17. The form assembly of claim 11, each of said reinforcing bar assemblies comprising a plurality of vertically spaced apart, generally horizontally extending reinforcing bars, and a plurality of upright, laterally spaced apart reinforcing bars, said horizontally extending reinforcing bars being secured to said upright reinforcing bars to present a reinforcing bar grid.

18. The form assembly of claim 17, said generally horizontally extending reinforcing bars being welded to said upright reinforcing bars.

19. The form assembly of claim 11, including an electrical box supported by at least one of said reinforcing bar assemblies.

20. A method of constructing a concrete wall structure comprising the steps of:
- erecting a concrete form assembly of claim 11; and
- pouring concrete into said space between said panels and in surrounding relationship to said insert assembly.

21. The method of claim 20, including the step of securing an electrical box to at least one of said reinforcing bar assemblies prior to said concrete pouring step.

22. The method of claim 20, wherein said space between said panels comprises a pair of sections located on opposite sides of said insert assembly, said pouring step comprising pouring concrete entirely into one of said sections at a time.

23. A concrete form assembly for producing a concrete sandwich wall structure and comprising:
- a pair of upright, laterally spaced apart concrete form panels defining a space therebetween; and
- an insert assembly located within said space and between said form panels, said insert assembly including—
    - a sheet of thermal insulating material presenting a pair of opposed side surfaces;
    - a reinforcing bar assembly located adjacent each of said opposed faces;
    - connection structure operably securing said reinforcing bar assemblies to said sheet so as to inhibit significant relative movement between said sheet and said reinforcing bar assemblies during said concrete pour;
    - an electrical box supported by at least one of said reinforcing bar assemblies; and
- a strap extending between and operably secured to a pair of reinforcing bars forming a part of said reinforcing bar assembly, said electrical box being secured to said strap.

* * * * *